United States Patent [19]

Fogelberg

[11] 4,076,108
[45] Feb. 28, 1978

[54] TWO-WAY OVERRUNNING CLUTCH MECHANISM

[75] Inventor: Mark John Fogelberg, Muncie, Ind.

[73] Assignee: Borg-Warner Corporation, Chicago, Ill.

[21] Appl. No.: 712,122

[22] Filed: Aug. 5, 1976

[51] Int. Cl.² ............... F16D 15/00; F16D 41/06
[52] U.S. Cl. ............................. 192/35; 192/44
[58] Field of Search ..................... 192/35, 36, 44

[56] References Cited
U.S. PATENT DOCUMENTS

| 2,796,941 | 6/1957 | Hill | 192/36 X |
| 3,055,471 | 9/1962 | Warn et al. | 192/35 X |
| 3,295,625 | 1/1967 | Ordorica et al. | 192/36 X |

Primary Examiner—Allan D. Herrmann
Attorney, Agent, or Firm—Julian Schachner

[57] ABSTRACT

A two-way overrunning clutch is automatically conditioned for operation in either direction of rotation. A plurality of spaced drag springs are in frictional contact with the clutch housing so as to provide balanced radial drag forces on the wedging elements of the clutch, thereby biasing the clutch toward an engaged position thereof. This frictional contact with the clutch housing is reduced by balanced dynamic friction forces developed upon rotation of the clutch.

6 Claims, 5 Drawing Figures

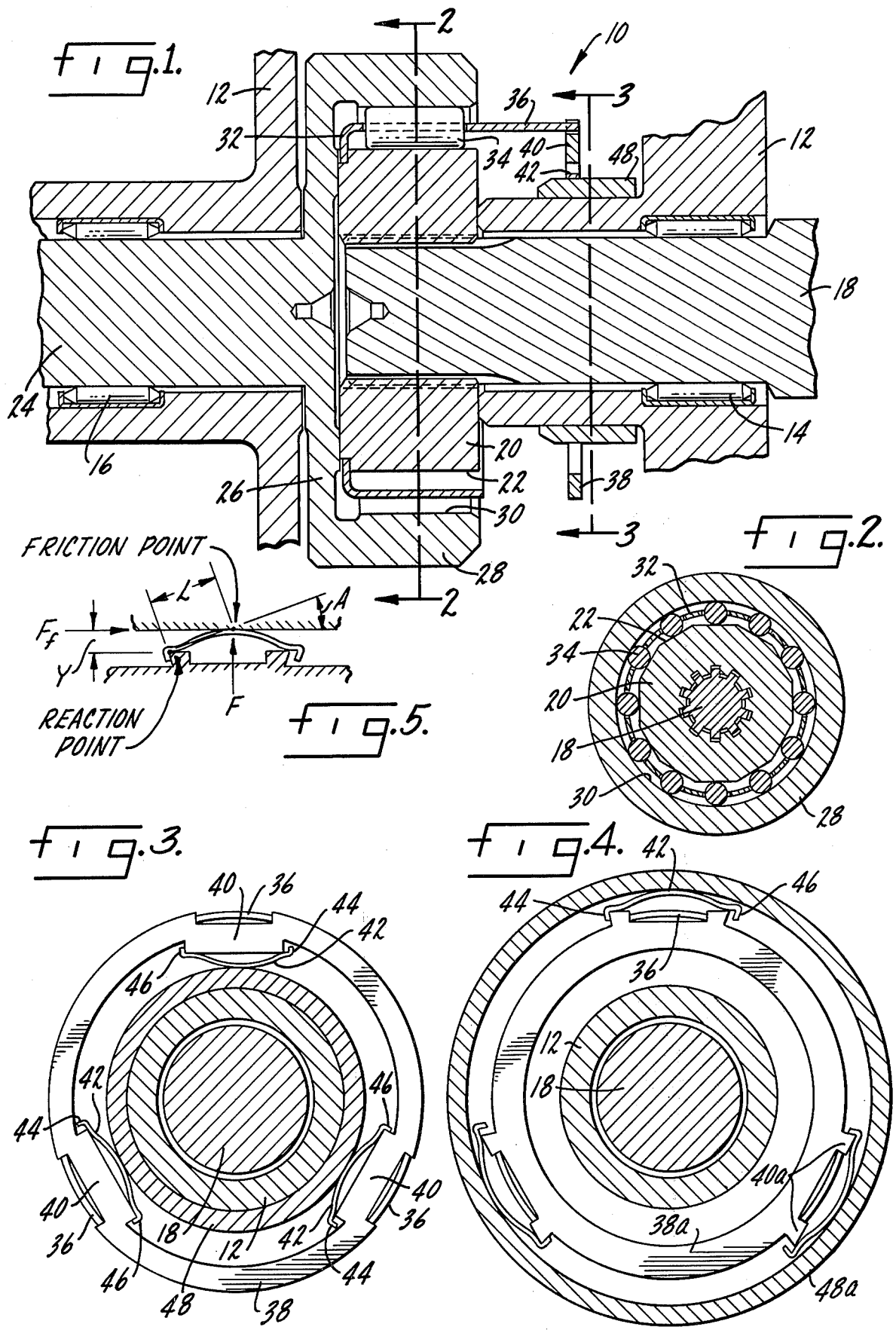

TWO-WAY OVERRUNNING CLUTCH MECHANISM

BACKGROUND OF THE INVENTION

This invention relates generally to clutch mechanisms. In particular, it relates to clutches of the two-way overrunning type.

Known clutch devices of this type generally provide a pair of spaced clutch races and a plurality of wedging elements supported by a cage intermediate the races. The wedging elements are rotationally displaceable relative to the races, and are movable into and out of wedging engagement therewith. Such a clutch device is disclosed in U.S. Pat. No. 3,055,471 wherein drag shoes are in frictional contact with the clutch housing, which drag shoes are connected with the cage in such a manner as to bias the wedging elements. Resilient means of some sort is provided for biasing the drag shoes toward frictional contact with the clutch housing. However, no provision is made for controlled reduction of the force of this frictional contact under dynamic conditions, or for controlled increase under static conditions.

Other known clutch devices of this type include torsion springs wrapped around the clutch housing or an element associated therewith to establish the frictional contact which serves to bias the wedging elements. Such a clutch device is disclosed in U.S. Pat. No. 3,380,563 wherein a torsion spring provides frictional contact with the clutch housing in order to bias a system of rollers. Upon rotation, the cage picks up a portion of the torsion spring and spreads it so as to reduce the force of this frictional contact. However, the arrangement provides for a single reaction point which is neither balanced nor centered. This creates the possibility of cocking the roller cage, resulting in undesirable binding of the rollers.

SUMMARY OF THE INVENTION

This invention is directed in brief to an improved two-way overrunning clutch mechanism. The clutch includes a pair of spaced elements defining clutch races and a clutch cage supporting a plurality of rollers between the races. The rollers are displaceable relative to the races into and out of wedging engagement therewith for effecting clutch engagement and disengagement.

The cage is biased toward clutch engagement in an improved manner. A plurality of spaced spring clips are in engagement with the cage and in frictional contact with the clutch housing so as to establish balanced pre-load static friction forces resulting in frictional engagement with the clutch housing. In operation, each spring clip is picked up at a reaction point spaced from its point of frictional contact with the clutch housing. Friction generated upon rotation of the clutch results in a moment tending to twist each spring clip about its respective reaction point. This moment tends to reduce the friction force developed by each spring clip. As a result, the force of frictional contact of the spring clips with the clutch housing is significantly lower under dynamic conditions than under static conditions.

BRIEF DESCRIPTION OF THE DRAWING

The objects and advantages of this invention will become apparent to those skilled in the art upon careful consideration of the specification herein, including the drawing, wherein:

FIG. 1 is a sectional view in elevation showing details of the clutch mechanism with the improved biasing mechanism;

FIG. 2 is a sectional view taken along the line 2—2 of FIG. 1, reduced in scale, showing additional details of the clutch;

FIG. 3 is a sectional view taken along the line 3—3 of FIG. 1 showing details of the clutch biasing mechanism;

FIG. 4 is a sectional view similar to FIG. 3 showing an alternative construction for the clutch biasing mechanism; and FIG. 5 is a schematic diagram of the clutch biasing mechanism shown in detail in FIGS. 3 and 4.

While this invention is susceptible of embodiment in many different forms, there is shown in the drawing and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawing in greater detail, there is shown generally a two-way overrunning clutch mechanism 10. It is contemplated that in one of its applications, clutch 10 may be incorporated in a torque transfer case associated with a four-wheel drive vehicle. Such a torque transfer case would be suitable for transmitting torque from a prime mover through a plurality of drive axle assemblies to drive front and rear pairs of traction wheels.

Clutch 10 is supported in a housing 12 which may be the housing of an associated torque transfer case. Housing 12 supports a pair of spaced bearings 14 and 16. A first shaft 18 is journalled in bearing 14 for rotation in housing 12. Shaft 18 may be driven by a prime mover and connected with a propeller shaft for driving the rear axle of a four-wheel drive vehicle. A cam 20 is splined to shaft 18 for rotation therewith. Cam 20 defines a plurality of flats or ramp surfaces 22 which serve as the inner race of clutch 10. A second shaft 24 is journalled in bearing 16 for rotation in housing 12. Shaft 24 may be connected with a propeller shaft for driving the front axle of a four-wheel drive vehicle. Shaft 24 defines an upstanding flange 26 and an annular extension 28. Extension 28 defines an inner cylindrical surface 30 which serves as the outer race of clutch 10.

An annular cage 32 supports a plurality of wedging elements 34, one of which is associated with each flat 22 of cam 20. In one form of the invention, wedging elements 34 are rollers and clutch 10 is a roller clutch. Cage 32 defines a plurality of outwardly extending fingers 36. As best shown in FIGS. 1 and 3, a drive ring 38 is supported by fingers 36 for rotation therewith. Ring 38 defines a plurality of annularly spaced lugs 40 around its inner perimeter. Lugs 40 preferably are formed from a low friction material. A plurality of spring clips 42 are in spaced relationship within the annular configuration of ring 38. Each spring clip 42 is associated with a lug 40 of ring 38, and defines a pair of end tabs 44 and 46 spaced slightly further apart than the length of its associated lug 40. This, in effect, there is a lost motion connection therebetween.

A sleeve 48 is press fit in housing 12 so as to be secured thereto. In one form of the invention, housing 12 may be formed from aluminum and sleeve 48 from steel. Each spring clip 42 is in frictional contact with sleeve 48 and is pre-loaded such that a friction force F is developed which acts on sleeve 48. In the schematic diagram of FIG. 5, it may be considered that each force F acts through a single friction point on sleeve 48. It should be understood that each spring clip 42 develops a friction force F and that these forces are balanced around sleeve 48.

In association with a transfer case for use in a four-wheel drive vehicle, for example, shaft 18 would be connected with the rear axle and shaft 24 with the front axle. Power would be directed to shaft 18 and the rear axle. Shaft 24 would rotate slightly faster than shaft 18 when the vehicle is turning, since the front wheels travel through a larger turning radius than do the rear wheels. If desired, means could be provided for causing shaft 24 normally to rotate slightly faster than shaft 18. Cam 20 rotates with shaft 18, and extension 28 with shaft 24. Thus, outer race 30 normally could overrun inner race 22.

In operation, cage 32 is rotated and fingers 36 carry ring 38. Assuming, for example, counterclockwise rotation of ring 38 as shown in FIG. 3, lugs 40 abut tabs 46 of spring clips 42 and carry spring clips 42 therewith in the counterclockwise direction. Each lug 40 abuts a spring clip 42 at a reaction point, as shown in FIG. 5. Thus, there is a reaction point associated with each friction point, and they are spaced equally around the inner periphery of ring 38. Due to the frictional contact of clips 42 with sleeve 48, which is in effect frictional contact with housing 12, balanced radial forces are developed which result in a relative drag effect on cage 32. This relative drag effect is developed without any axial forces acting on cage 32, and thus there is no tendency for rollers 34 to bind.

The drag effect on cage 32 tends to bias rollers 34 toward a wedging position between inner race 22 and outer race 30, thus tending to engage clutch 10. The slight overrun of extension 28 relative to cam 20 tends to overcome the effect of this bias by developing a force which acts on rollers 34 such that they tend to be biased away from engagement, toward the freewheel position of clutch 10. Thus, relative rotation between extension 28 and cam 20 prevents engagement of clutch 10.

When this relative rotation approaches zero, the drag effect on cage 32 causes rollers 34 to wedge between cam 20 and extension 28. When this takes place, clutch 10 will be engaged and torque will be transferred to shaft 24.

It is desirable that the friction force F be at a maximum when the mechanism is at rest or when it is reversing direction. It is also desirable that the friction force F be diminished under dynamic conditions when the mechanism is rotating in either direction. This is accomplished by the lost motion relationship between each lug 40 and tabs 44 and 46 of its associated spring clip 42. When ring 38 is at rest, such as, for example, during the slight interval when an associated vehicle is shifted from forward to reverse or vice-versa, the force F exerted by spring clips 42 on sleeve 48 is, in effect, static friction acting through the friction point. As ring 38 begins to rotate, each lug 40 abuts a spring clip 42 at the reaction point and begins to drive spring clip 42. As a result, another friction force $F_f$ is developed. This force $F_f$ acting through the distance Y, the radial distance between the friction point and the reaction point, develops a moment which acts about the reaction point (clockwise in FIG. 5). The force F acting through the friction point under dynamic conditions thus is reduced.

Force F under dynamic conditions would be equal to force F under static conditions minus $F_f(Y)/(L)$ cosine A, where L is the distance between the reaction and friction points and A is the angle formed by this line and the tangent to sleeve 48 through the friction point. As $F_f$, L, Y and cosine A are finite and positive, the result is that force F under dynamic conditions is less that it would be under static conditions.

As advantage of the lost motion relationship between lug 40 and spring clip 42 is that upon reversal of the direction of rotation such as, for example, from counterclockwise to clockwise as shown in FIG. 2, there would be sufficient time for rollers 34 to be shifted across cam 20 from one side of flats 22, through the central position shown, to the other side of flats 22. But for this relationship, upon reversal of direction, extension 28 conceivably could keep rollers 34 from shifting across cam 20. This would result in undesirable lockup of clutch 10.

Of course, initial rotation of ring 38 in the clockwise direction would cause lugs 40 to abut and drive tabs 44 of spring clips 42, and the biasing of clutch 10 would be the same.

Turning to the configuration of FIG. 4, there is shown an alternative arrangement whereby a ring 38a is driven by fingers 36 of cage 32. Ring 38a has outwardly extending lugs 40a which support spring clips 42 in the same manner as do inwardly extending lugs 40 of ring 38. A sleeve 48a as press fit in the interior of a channel (not shown) in housing 12. Spring clips 42 contact the inner surface of sleeve 48a. The operation of clutch 10 is the same regardless of which configuration is used.

Cage 32 is frictionally biased to ground in such a manner as to develop controlled, balanced radial drag forces but no axial biasing forces which would cause binding of the wedging elements. The frictional bias developed is a static frictional contact force, which force is reduced under dynamic conditions.

Although one use for the clutch is in association with a transfer case for a four-wheel drive vehicle, it should be understood that this is not limiting, and its use in other environments is contemplated. Also, it should be understood that while one preferred embodiment of the invention has been shown and described, this is illustrative and may be modified by those skilled in the art without departing from the scope of the invention, which is to be limited only by the claims herein.

I claim:

1. In a two-way engaging device including first and second rotatable members, one of said rotatable members defining an inner race and the other of said rotatable members defining an outer race, wedging means disposed between said inner and outer races for selectively providing a wedgingly engaged drive between said rotatable members in either a clockwise or counterclockwise direction, a stationary member, and biasing means for said wedging means; the improvement wherein said biasing means comprises drive means engaged with said wedging means, said drive means defining a drive element having a plurality of lugs, and a plurality of spring clips each engaged with a respective lug by a lost motion connection, said spring clips frictionally contacting said stationary element with a friction force of predetermined magnitude, said spring clips yielding toward frictional contact with said stationary member at a decreased friction force in response to rotation of said rotatable members.

2. The invention of claim 1, each of said lugs abutting and driving its associated spring clip in response to rotation of said rotatable members such that a force is developed in opposition to said friction force of predetermined magnitude.

3. The invention of claim 2, each of said lugs abutting and driving its associated spring clip in response to rotation of said rotatable members such that friction develops a moment about the place of abutment, said moment developing said force in opposition to said friction force of predetermined magnitude.

4. The invention of claim 3, each of said lugs and its associated spring clip being cooperable to develop said moment in response to rotation of said rotatable members in either direction.

5. In a two-way engaging device including first and second rotatable members respectively defining first and second races, wedging means disposed between said races for selectively providing wedgingly engaged drive between said rotatable members in either a clockwise or counterclockwise direction, a stationary member, and biasing means for said wedging means; the improvement wherein said biasing means comprises drive means engaged with said wedging means, and at least one yieldable element engaged with said drive means and in frictional contact with said stationary member, said biasing means constructed and arranged such that in response to rotation of at least one of said rotatable members a moment is developed which tends to reduce the frictional contact of said yieldable element with said stationary member.

6. The invention of claim 5, said yieldable element engaged with said drive means by a lost motion connection.

* * * * *